United States Patent
Lefebure (12)

(10) Patent No.: US 6,726,467 B1
(45) Date of Patent: Apr. 27, 2004

(54) INJECTION MOLDING NOZZLE

(75) Inventor: Brian R. Lefebure, Lee's Summit, MO (US)

(73) Assignee: R&D Tool & Engineering Co., Lee's Summit, MO (US)

( * ) Notice: Subject to any disclaimer, the term of this patent is extended or adjusted under 35 U.S.C. 154(b) by 0 days.

(21) Appl. No.: 10/272,974

(22) Filed: Oct. 16, 2002

(51) Int. Cl.⁷ .............................................. B29C 45/20
(52) U.S. Cl. .................. 425/549; 264/328.15; 425/572
(58) Field of Search ................................ 425/549, 572; 264/328.15

(56) References Cited

U.S. PATENT DOCUMENTS

| | | | |
|---|---|---|---|
| 3,512,216 A | | 5/1970 | Voelker |
| 3,718,166 A | | 2/1973 | Gordon |
| 3,758,252 A | | 9/1973 | Kohler |
| 3,940,226 A | | 2/1976 | Verhoeven |
| 4,793,795 A | * | 12/1988 | Schmidt et al. ............. 425/549 |
| 4,810,184 A | * | 3/1989 | Gellert et al. ............... 425/549 |
| 5,299,928 A | * | 4/1994 | Gellert .................. 264/328.15 |
| 5,310,332 A | | 5/1994 | Ito et al. |
| 5,522,720 A | | 6/1996 | Schad |
| 5,578,329 A | | 11/1996 | Hehl |
| 5,879,727 A | * | 3/1999 | Puri ............................ 425/549 |
| 6,261,084 B1 | * | 7/2001 | Schmidt ........................ 425/572 |
| 6,302,680 B1 | * | 10/2001 | Gellert et al. ............... 425/549 |
| 6,341,954 B1 | * | 1/2002 | Godwin et al. .............. 425/549 |

* cited by examiner

*Primary Examiner*—Tim Heitbrink
(74) *Attorney, Agent, or Firm*—Hovey Williams LLP

(57) ABSTRACT

Multi-cavity injection molding apparatus includes a plurality of injection nozzles, each of which has a two-piece tip assembly in the nature of a replaceable tip and a retainer that detachably secures the tip to the nozzle body. The retainers are constructed from material having a lower coefficient of thermal conductivity than the tips so that the retainers also serve to insulate the tips from the relatively cold, surrounding heat sink presented by the mold. Although each retainer prevents its tip from being unintentionally axially released from the nozzle body, the retainer engages the tip at only two axially spaced locations along its length so as to present an insulating air gap in surrounding relationship to much of the tip. The otherwise exposed end of the air gap is sealed off when the nozzle is hot by virtue of a sealing collar on the retainer that progressively tightens against the cooperating, beveled surface of the tip as the tip heats up. Each nozzle is mounted on the manifold block in a ball and socket relationship so that the nozzles can swivel and self-align as the manifold block and nozzles heat up from room temperature to operating temperature at the commencement of the injection process.

21 Claims, 4 Drawing Sheets

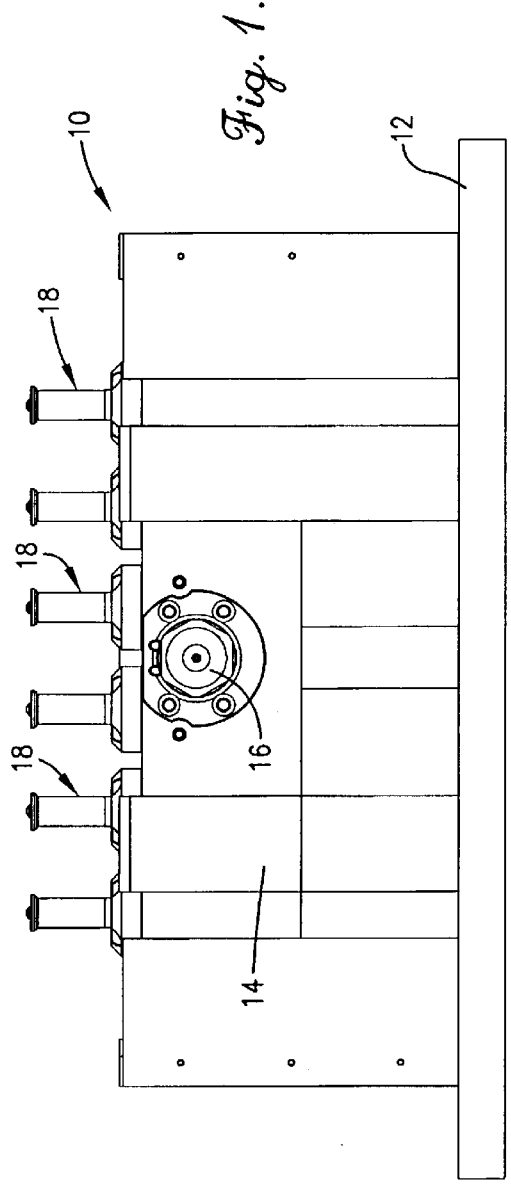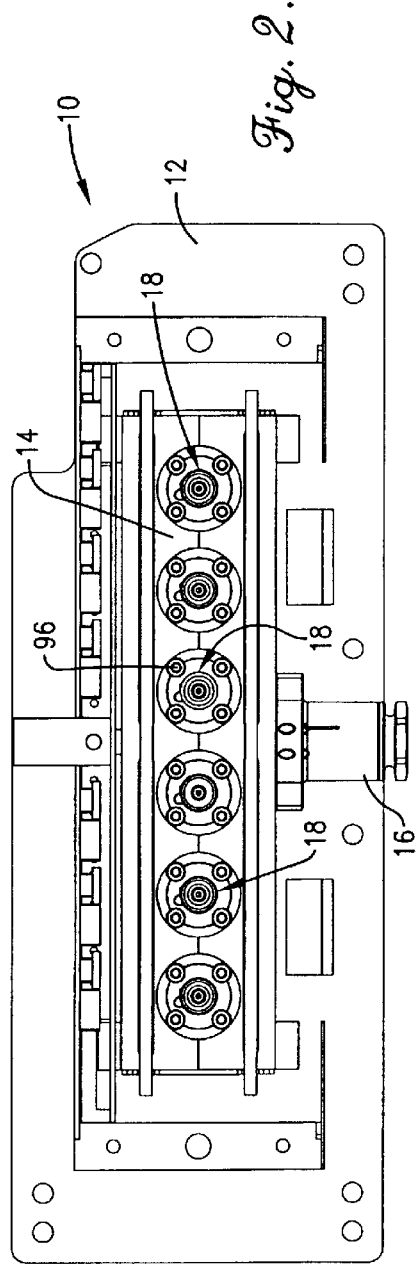

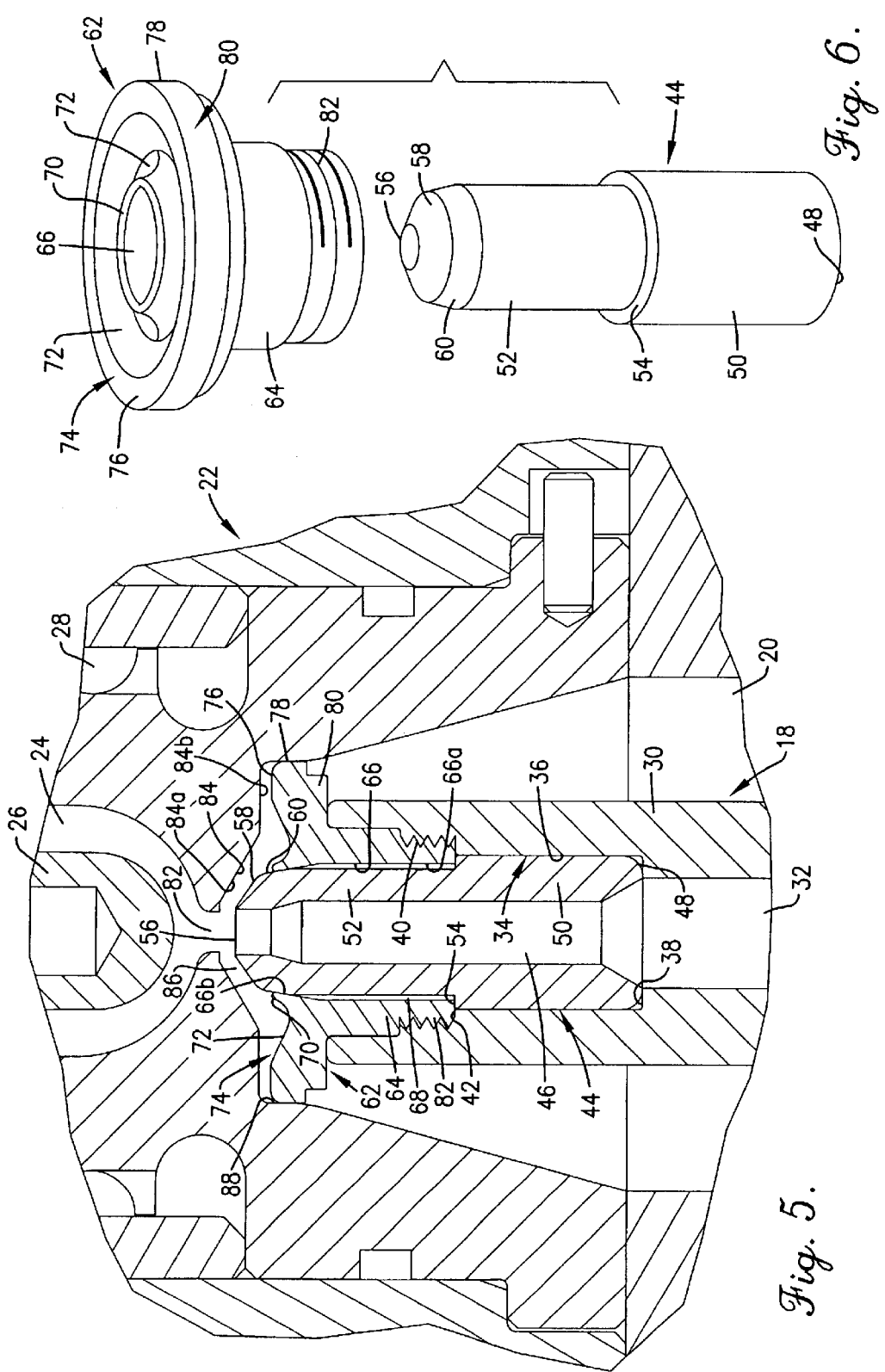

INJECTION MOLDING NOZZLE

TECHNICAL FIELD

The present invention relates to injection molding apparatus and, more particularly, to improvements in the construction of nozzles that deliver hot melt into the mold cavities of such equipment.

BACKGROUND

It is known in the art to provide injection nozzles with two-piece tip assemblies comprising a replaceable inner tip or insert and a collar-like retainer that detachably secures the tip to the main body of the nozzle. See, for example, Gellert U.S. Pat. No. 5,299,928.

It is also known to make the retainer from a lower thermally conductive material than the tip itself so that the tip, through which the hot melt travels on its way to the mold cavity, is thermally insulated by the retainer from adjacent portions of the relatively cold mold. The '928 patent, for example, describes constructing the tip from a highly thermally conductive material such as a beryllium copper alloy while forming the outer retainer from a much less thermally conductive material such as a titanium alloy.

While using the retainer to insulate the hot nozzle tip from proximal portions of the cold mold is helpful in increasing the thermodynamic efficiency of the apparatus, the extent of direct physical contact between the insulating retainer and the hot tip also has a direct bearing on heat loss. Because the retainer is not a perfect insulator, there is still a significant amount of heat loss from the tip to the cold mold via the retainer, particularly across regions where the tip and the retainer are in intimate physical contact with one another.

Furthermore, as the manifold block and the nozzles attached to the block heat up as they are prepared for dispensing the hot melt, and during the injection process itself, dimensional changes take place involving the nozzles. Generally speaking, while the nozzles and manifold block tend to grow or expand as they become hot, the mold remains much cooler and dimensionally stable such that the nozzles can become misaligned with the mold cavities. For example, while the center-to-center distances between gates in a multi-cavity machine remains essentially constant at all times, the center-to-center distance between the base ends of the nozzles can increase significantly as the metal manifold block expands under high heat conditions. Consequently, while the nozzles may be in perfect registration with the gates when the apparatus is cold, the base ends of the nozzles may move out of axial registration with the mold cavity as the manifold block and nozzles heat up, placing bending loads on the nozzles as their discharge ends are retained in place by surrounding portions of the mold. This obviously places undue stress on the nozzles and can lead to premature wear and fatigue, as well as having adverse effects on the proper injection of hot melt through the gate and the ability to produce a preform product having only a minimal gate vestige at the completion of the forming cycle. Furthermore, if the manifold and the mold are pulled apart for maintenance purposes or adjustment, once the discharge ends of the nozzles are released by the mold they tend to spring back into alignment with their bases, which means that the discharge ends are now out of registration with the receiving wells in the mold and cannot be reinserted into the mold until after they have been cooled down. This can result in a significant amount of downtime in an industry where it is crucially important to keep the molding apparatus in continuous productive operation as much as possible.

SUMMARY OF THE INVENTION

In accordance with the present invention, a two-piece tip assembly on an injection molding nozzle has the insulating sleeve of the retainer surrounding the nozzle tip in radially spaced relation thereto so as to form an insulating air gap between the retainer and the tip along a significant portion of the length of the tip so as to reduce heat loss from the tip to the cold mold. The bore through the insulating retainer is constricted at its outer end so as to form a collar on the retainer that is very slightly spaced from the adjacent surface of the tip when the tip is cold. However, when the tip is hot such as during injection operations, expansion and growth of the tip relative to the retainer causes the collar to tighten around the tip so as to effectively seal off the insulating air gap from hot melt that might attempt to back fill into the air gap from beyond the nozzle. Direct physical contact between the retainer and the tip is limited to only two points, i.e., the seal at the sealing collar, and the abutment at the inner end of the retainer where it overlies and engages an outwardly facing shoulder on the tip.

In addition, the present invention contemplates having the base ends of the injection nozzles swivel-mounted in the manifold block so that the nozzles can self-adjust or self-compensate as the manifold block grows and expands when heated. To this end, the manifold block is provided with a number of concave seats that matingly receive the lower halves of spherical base portions of the nozzles. Clamp-down structure attaching the nozzles to the manifold block is provided with internal concavities that matingly receive the upper halves of the spherical bases. The retainer at the discharge end of each nozzle is configured to present a laterally outermost edge that resides in close proximity to a surrounding wall portion of the nozzle-receiving well in the mold so that the discharge end of the nozzle stays properly located and registered with the gate while permitting swiveling action at the lower end. Opposing surfaces of the mold and the nozzle tip assembly are configured in such a manner as to maximize delivery of hot melt into and through the gate while minimizing the amount of excessive back fill of melt into the void area between the mold surface and the nozzle tip assembly surface.

BRIEF DESCRIPTION OF THE DRAWINGS

FIG. 1 is a front elevational view of a manifold utilizing injection molding nozzles constructed in accordance with the principles of the present invention;

FIG. 2 is a top plan view of the manifold;

FIG. 5 is an enlarged, fragmentary cross-sectional view of the discharge end of one nozzle and associated mold structure illustrating the relationship of parts; and FIG. 6 is an exploded, isometric view of the nozzle tip and retainer therefor in accordance with the present invention.

DETAILED DESCRIPTION

Figure 3:
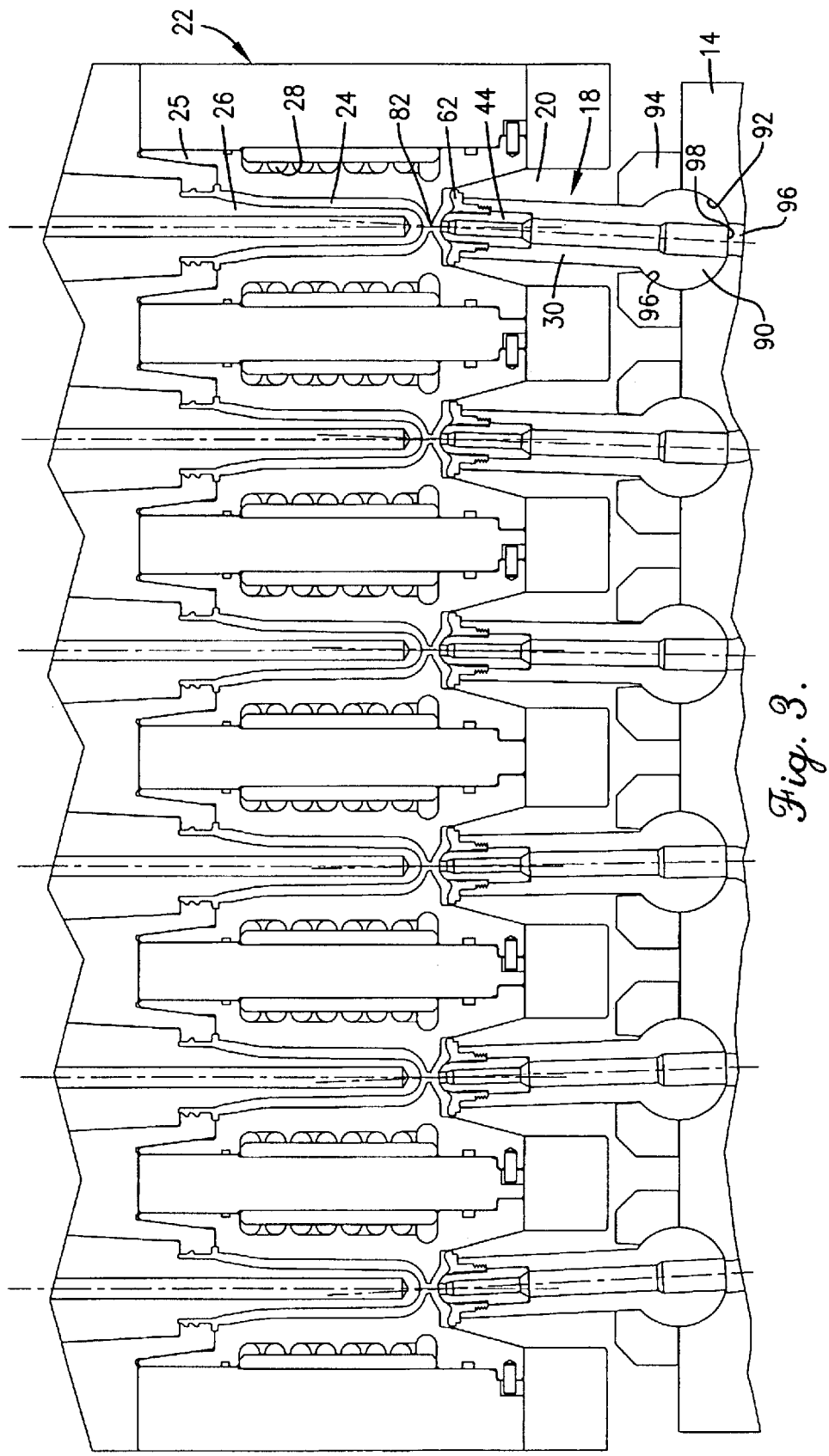
FIG. 3 is an enlarged, fragmentary, cross-sectional, schematic illustration of the relationship between the injection nozzles and the mold while the nozzles and distribution manifold are relatively cold before commencement of the molding process.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

The manifold 10 in FIGS. 1 and 2 includes a base plate 12 that supports an upright manifold block 14 which receives hot melt through an inlet sprue 16. Internal passages within block 14 in turn distribute the hot melt to a number of injection nozzles 18, here shown as being six in number corresponding to a six cavity mold.

Figure 4:
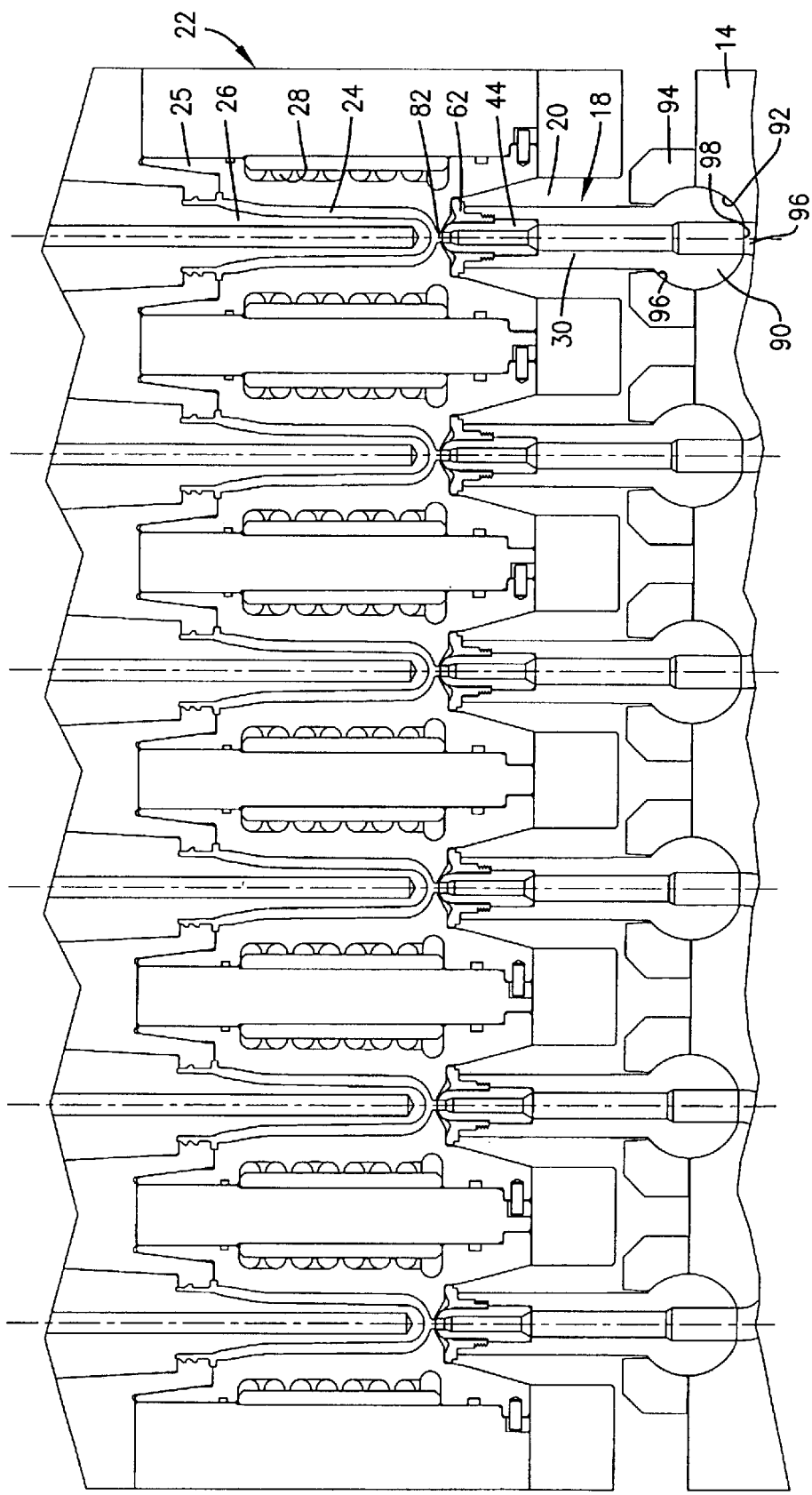
FIG. 4 is an illustration of the nozzles and mold similar to FIG. 3 but illustrating the way in which the nozzles have swivelled into axially aligned relationship with the mold cavities after the manifold and nozzles have been heated up.

As illustrated in FIGS. 3, 4 and 5, during use of the manifold 10 nozzles 18 project into corresponding receiving wells 20 within a mold 22 for the purpose of delivering hot melt into corresponding cavity spaces 24 within cavities 25 of mold 22. Each space 24 receives a core 26 that cooperates with a cavity 25 to define the appropriate configuration of space 24 prior to and during the reception of the hot melt. Cores 26 are withdrawn from the spaces 24 at the completion of each injection cycle. Cooling channels 28 surrounding each space 24 are supplied with suitable coolant for the purpose of cooling cavity 25 and the product therein. Nozzles 18 and manifold block 14 are heated by suitable heating apparatus not shown, but well understood by those skilled in the art.

As illustrated particularly in FIG. 5, each nozzle 18 includes an elongated, tubular nozzle body 30 having a central passage 32. A coaxial socket 34 is recessed into the discharge end of body 30 in communication with passage 32. Socket 34 includes a cylindrical smooth-walled inboard portion 36 that is somewhat larger in diameter than passage 32 so as to present an annular shelf 38 that circumscribes the outlet of passage 32. Socket 34 also includes an outboard portion 40 that is coaxial with but larger in diameter than inboard portion 36 so as to present a second shelf 42 at the intersection of inboard and outboard portions 36 and 40. An inner stretch of the wall surface defining outboard socket portion 40 is internally threaded, while an outer stretch thereof is smooth-walled.

Socket 34 removably receives a replaceable nozzle tip 44, shown in an isolated condition in FIG. 6. Tip 44 is tubular, having a central passage 46 therethrough for receiving melt from passage 32 when tip 44 is received within socket 34. Tip 44 is of generally cylindrical overall configuration and has a bottom end 48 that abuts and rests upon shelf 38 when tip 44 is in place within socket 34. Tip 44 includes a cylindrical base portion 50 of one diameter and a neck portion 52 of a lesser diameter so as to present an axially outwardly facing shoulder 54 at the intersection of base portion 50 and neck portion 52. Most of the exterior of neck portion 52 extends parallel to the axis of passage 46. However, the end face 58 of tip 44 surrounding outlet 56 of passage 46 presents a truncated cone, while a bevel ring 60 at a different angle than end face 58 is disposed between the straight cylindrical portion of neck portion 52 and end face 58. Preferably, tip 44 is constructed of a highly thermally conductive material such as a suitable bronze alloy, preferably Ampco 940.

Each nozzle 18 also includes an insulating retainer 62 that is detachably secured to nozzle body 30 and which removably holds tip 44 in place within socket 34. Preferably, retainer 62 is constructed from a titanium alloy so as to have substantially lower thermal conductivity than tip 44. As a primary component retainer 62 comprises a sleeve 64 having a through bore 66 that receives neck portion 52 of tip 44. Bore 66 includes an enlarged, inboard section 66a that circumscribes neck portion 52 in radially spaced relation thereto so as to define an insulating air gap 68 around neck portion 52. Bore 66 also includes a constricted outboard section 66b of reduced diameter relative to inboard section 66a so as to define a sealing collar 70 surrounding the bevel 60 on neck portion 52. Although the diameter of outboard section 66b is slightly greater than that of bevel 60 when tip 44 is cold, it will be appreciated that as tip 44 becomes hot and grows in length, collar 70 comes into tight, sealing contact with neck portion 52 at bevel 60 so as to close off air gap 68 at that location.

A dished out recess 72 in end face 74 of retainer 62 circumscribes collar 70 so as to thin down collar 70 and provide a slight amount of flexibility thereto to facilitate sealing contact between collar 70 and bevel 60 at the appropriate time. Such recess 72 also provides less metal for retainer 62 in the immediate vicinity of its point of contact with bevel 60 so as to reduce heat loss from tip 44 in that area. End face 74 also includes an annular flat region 76 that circumscribes recess 42 and extends radially outwardly to the outermost peripheral edge 78 of an overhanging lip 80 on sleeve 64. The exterior of sleeve 64 generally adjacent the inboard end thereof contains a set of threads 82 that mesh with the internal threads within socket 34 to detachably secure retainer 62 to the body 30. It will be appreciated to those skilled in the art that means other than intermeshing threads may be used to effect such releaseable attachment.

The cavity space 24 and the nozzle-receiving well 20 are communicated with one another by a relatively short, narrow gate 82 so that, during operation, hot melt from the nozzle 18 passes through gate 82 and into space 24. Well 20 has an innermost end surface 84 that faces nozzle 18 and cooperates with end face 74 of retainer 62 and end face 58 of tip 44 to define a relatively thin void 86. Thus, end face 58 of tip 44 and end face 74 of retainer 62 are not in contacting engagement with end surface 84 of well 20 but are instead spaced slightly axially therefrom. Preferably, end surface 84 is configured to present a conical depression 84a that surrounds gate 82 and is almost complemental to the conical end face 58 of tip 44, although it will be noted that end face 58 is slightly more sharply inclined than depression 84a such that void 86 becomes slightly more progressively constricted as gate 82 is approached. Depression 84a extends laterally outwardly to a point beyond collar 70 on retainer 62 and into general registration with recess 72, whereupon surface 84 changes to an annular flat region 84b that surrounds depression 84a and extends generally parallel to the flat region 76 on end face 74 of retainer 62. It will be noted that void 86 is somewhat thinner in the area between flat regions 76 and 84b than between depression 84a and end face 58 of tip 44.

Well 20 is substantially larger in diameter than nozzle body 30 so as to provide a substantial amount of air space surrounding body 30 to insulate it from mold 22. However, well 20 also tapers toward a reduced diameter dimension as gate 82 is approached, and at its inner end, well 20 is provided with a relatively short, axially extending sidewall 88 that extends parallel to the peripheral edge 78 of retainer 62 and circumscribes the same. The diameter of well 20 at sidewall 88 is only slightly larger than the outer diameter of retainer 62 at edge 78 such that sidewall 88 serves to locate and confine retainer 62 against lateral displacement, thus maintaining melt passage 46 and outlet 56 of tip 44 in axial registration with gate 82.

As illustrated in FIGS. 3 and 4, each nozzle 18 is provided with a generally spherical base 90 whose lower half is matingly received within a corresponding concave seat 42 in the top surface of manifold block 14. Structure for retaining bases 90 within their seats 92 in a manner to permit swiveling of bases 90 comprises a plurality of retaining collars 94 secured to manifold block 14 by fasteners such as screws 96 (FIG. 2). Each retaining collar 94 has a cavity 96 on its underside that matingly receives and overlies the upper half of the corresponding spherical base 90 so as to retain the nozzle on manifold block 14 yet permit it to swivel in the manner of a ball and socket. Preferably, each retaining collar 94 is constructed from graphite impregnated tool steel that has been oil-hardened in order to provide the necessary amount of lubricity and resistance to galling. Manifold block 14 has a hot melt supply port 96 at the base of each seat 92, and each spherical base 90 has an inlet 98 to the passage 32.

Operation

Because the mold 22 remains relatively cool throughout the injection molding process, the center-to-center distance between gates 82 remains substantially unchanged. However, because the temperature of the manifold block 14 and nozzles 18 increases so substantially from room temperature to operating temperature, the dimensions of manifold block 14 and nozzles 18 increase correspondingly. Thus, as the manifold block heats up, the center-to-center distance between bases 90 of the nozzles 18 increases, with the smallest increase occurring between nozzles at the center of manifold block 14 and the largest increase being experienced at the outermost nozzles.

FIG. 3 is an exaggerated illustration of the condition that exists when manifold block 14 and nozzles 18 are at room temperature, at which time the center-to-center distance between bases 90 is slightly less than the center-to-center distance between gates 82. Consequently, when the nozzles 18 are inserted up into wells 20, nozzles 18 swivel slightly about their bases 90 as the retainers 62 become located within the bounds of the axial sidewall portion 88 of the well. As illustrated in FIG. 3 on an exaggerated scale, each nozzle 18 thus becomes slightly tipped, about 5°, as the outlets 56 of the nozzles come into registration with gates 82.

As manifold block 14 and nozzles 18 are then heated up, as illustrated in FIG. 4, the expanding manifold block causes the axes of the nozzles to line up with the axes of the cavity spaces 24. Due to the ball and socket relationship between the base of the nozzles and the manifold block 14, the nozzles are free to self-adjust or self-compensate for the changing conditions, and only to the extent required by such changes. It will be noted that because the retainers 62 are captive within the sidewalls 88 of wells 20 during such change in conditions, the nozzle outlets 56 remain aligned with gates 82 throughout the process and that any misalignment occurs at the base ends of the nozzles due to rotation of bases 90 relative to seats 92.

It will also be noted that each nozzle body 30 and tip 44 grows axially as the nozzle is heated up. Thus, one result is that the outer faces 58 and 74 of the nozzle tip and retainer respectively are displaced closer and closer to gate 82 and end surface 84 of well 20. In addition, because of the different coefficients of thermoconductivity between nozzle tip 44 and retainer 62, neck portion 52 of tip 44 projects progressively further through and out of collar 70 toward gate 82 as tip 44 gets hot. This axial growth of tip 44 causes bevel 60 to progressively present larger portions of its circumference to the constricted outboard section 66b of bore 66, resulting in a progressively tighter and tighter seal between collar 70 and tip 44.

Consequently, when nozzles 18 are hot, the air gap 68 surrounding each neck portion 52 is effectively sealed off against the admittance of hot melt that backfills within void 86 laterally outwardly from each gate 82. This provides better insulation for tip 44 than would otherwise be the case and less consequent heat loss to the cold mold 22. It will be noted also that due to the fairly constricted nature of void 86 between flat regions 76 and 84b, backfill of the hot melt will not extend out to the outermost periphery 78 of retainer 62 but will instead terminate somewhere in the vicinity of the dished out recess 72. This condition also aids in reducing heat loss from the nozzles 18 and facilitates cleaning out of solidified backfill material on the mold apparatus when a different melt material or color is to be injected.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the doctrine of equivalents to determine and assess the reasonably fair scope of his/their invention as pertains to any apparatus not materially departing from but outside the literal scope of the invention as set out in the following claims.

What is claimed is:

1. An injection molding nozzle for dispensing hot melt comprising:

an elongated, tubular nozzle body having an axially disposed socket in a discharge end thereof;

a generally cylindrical, hollow nozzle tip located within said socket and having an inboard base portion of one diameter and an outboard neck portion of a lesser diameter to present an outwardly facing shoulder at the intersection of the base portion and the neck portion; and a retainer detachably secured to the body and removably retaining the tip within said socket, said retainer including a sleeve located within said socket in surrounding relation to said neck portion of the tip, said sleeve having an inboard end that overlies and abuttingly engages the shoulder of the tip to prevent axial displacement of the tip from the socket, said sleeve further having an axial, tip-receiving bore therethrough that has an enlarged inboard section circumscribing the neck portion of the tip in radially spaced relation thereto to define an insulating air gap that surrounds the neck portion of the tip, said bore further including a constricted outboard section defining a collar on the retainer that circumscribes and substantially sealingly engages the neck portion of the tip when the nozzle is hot to prevent substantial entry of hot melt into the air gap from outside the nozzle.

2. An injection molding nozzle as claimed in claim 1, said retainer being constructed of a lower thermally conductive material than the tip.

3. An injection molding nozzle as claimed in claim 1, said constricted outboard section of the bore being tapered in a manner to progressively decrease in diameter as the enlarged inboard section is departed.

4. An injection molding nozzle as claimed in claim 3, said tip having an annular bevel surrounded by said constricted outboard section of the bore, said collar engaging the bevel of the tip when the nozzle is hot.

5. An injection molding nozzle as claimed in claim 4,
said retainer having an outboard end face,
said end face having an annular recess surrounding said collar.

6. An injection molding nozzle as claimed in claim 5,
said retainer having an annular lip projecting radially outwardly from said sleeve and overhanging the discharge end of the nozzle body.

7. An injection molding nozzle as claimed in claim 6,
said retainer being constructed of a lower thermally conductive material than the tip.

8. An injection molding nozzle as claimed in claim 1,
said detachable securement of the retainer to the nozzle body being effected by intermeshing threads between the retainer and the body.

9. Hot melt distribution apparatus for use in an injection molding machine comprising:
a manifold block having a plurality of concave swivel seats;
a corresponding plurality of discharge nozzles, each having a generally spherical swivel base matingly nested within a corresponding one of the seats; and
structure securing the nozzles to the block in a manner to permit the base of each nozzle to swivel within its seat,
each of said seats having a hot melt supply port and the base of each nozzle having a hot melt inlet communicating with said port in different swivelled positions of the nozzle.

10. Hot melt distribution apparatus as claimed in claim 9,
said structure including a retaining collar surrounding each of said nozzles, respectively,
each of said retaining collars having an underside provided with a cavity matingly receiving said base of the nozzle to retain the base in its seat while permitting swivelling movement of the nozzle,
said structure further including fasteners securing each retaining collar to the block.

11. Injection molding apparatus comprising:
a mold having a plurality of product cavity spaces, a corresponding number of nozzle-receiving wells for the cavity spaces, and a gate communicating each cavity space with a corresponding one of the wells; and
distribution apparatus for injecting hot melt into the cavity spaces, said distribution apparatus comprising,
a manifold block having a plurality of concave swivel seats,
a corresponding plurality of discharge nozzles projecting into said wells for delivering hot melt to the cavity spaces through said gates,
each nozzle having a generally spherical swivel base matingly nested within a corresponding one of the seats, and
structure securing the nozzles to the block in a manner to permit the base of each nozzle to swivel within its seat,
each of said seats having a hot melt supply port and the base of each nozzle having a hot melt inlet communicating with said port in different swivelled positions of the nozzle,
each of said nozzles including an elongated nozzle body, a replaceable tip at a discharge end of the body remote from the base, and a retainer detachably secured to the body and removably retaining the tip on the body,
each of said retainers having an end face and a radially outermost, circular edge that is disposed radially outwardly beyond said body,
said tip projecting axially through and beyond said face and having a melt passage,
each well having an innermost, end surface through which the gate extends,
said end surface being disposed in spaced opposition to the face of the retainer to present a void between the end surface and the retainer face,
each well further having an axially extending sidewall circumscribing said edge of the retainer at the lateral extremity of said end surface to locate and maintain the melt passage of the tip in axial registration with the gate of the mold during swivelling of the nozzle,
each of said retainers being constructed of a lower thermally conductive material than the corresponding tip whereby to insulate the tip from the mold.

12. Injection molding apparatus as claimed in claim 11,
said nozzle body having an axially disposed socket in said discharge end that receives said nozzle tip,
said nozzle tip being generally cylindrical and having an inboard base portion of one diameter and an outboard neck portion of a lesser diameter to present an outwardly facing shoulder at the intersection of the base portion and the neck portion,
said retainer including a sleeve located within said socket in surrounding relation to said neck portion of the tip,
said sleeve having an inboard end that overlies and abuttingly engages the shoulder of the tip to prevent axial displacement of the tip from the socket,
said sleeve further having an axial, tip-receiving bore therethrough that has an enlarged inboard section circumscribing the neck portion of the tip in radially spaced relation thereto to define an insulating air gap that surrounds the neck portion of the tip,
said bore further including a constricted outboard section defining a collar on the retainer that circumscribes and substantially sealingly engages the neck portion of the tip when the nozzle is hot to prevent substantial entry of hot melt into the air gap from the void during delivery of hot melt to the gate from the melt passage of the tip.

13. Injection molding apparatus as claimed in claim 12,
said constricted outboard section of the bore being tapered in a manner to progressively decrease in diameter as the enlarged inboard section is departed.

14. Injection molding apparatus as claimed in claim 13,
said tip having an annular bevel surrounded by said constricted outboard section of the bore,
said collar engaging the bevel of the tip when the nozzle is hot.

15. Injection molding apparatus as claimed in claim 12,
said end face of the retainer having an annular recess surrounding said collar.

16. Injection molding apparatus as claimed in claim 15,
said retainer having an annular lip projecting radially outwardly from said sleeve,
said edge of the retainer being located at the radially outermost extremity of the lip.

17. Injection molding apparatus as claimed in claim 11,
said detachable securement of the retainer to the nozzle body being effected by intermeshing threads between the retainer and the body.

18. Injection molding apparatus as claimed in claim 12, said end surface of the well including a generally conical depression surrounding said gate, said tip of the nozzle projecting into said depression and being spaced axially from said gate.

19. Injection molding apparatus as claimed in claim 18, said end surface of the well further having an annular flat region circumscribing said depression, said face of the retainer having an annular flat region extending radially inwardly from the outermost edge of the retainer and disposed in generally parallel relationship with said flat region of the end surface of the well, said void being thinner in the area between said flat regions than in the area between the depression and the nozzle tip.

20. Injection molding apparatus as claimed in claim 19, said face of the retainer having an annular recess between said collar and said flat region of the face.

21. Hot melt distribution apparatus as claimed in claim 11, said structure including a retaining collar surrounding each of said nozzles, respectively, each of said retaining collars having an underside provided with a cavity matingly receiving said base of the nozzle to retain the base in its seat while permitting swivelling movement of the nozzle, said structure further including fasteners securing each retaining collar to the block.

* * * * *